United States Patent
Barta et al.

[11] 3,775,683
[45] Nov. 27, 1973

[54] ELECTRICAL POWER MEASURING DEVICE

[76] Inventors: Karel Barta, 1952 Montclair Ct., Walnut Creek, Calif. 94596; Wilson S. Pritchett, 6262 Highland Ave., Richmond, Calif. 94804

[22] Filed: May 10, 1972

[21] Appl. No.: 252,346

[52] U.S. Cl. ............... 324/142, 235/194, 328/160
[51] Int. Cl. ........................ G01r 21/00, G06g 7/16
[58] Field of Search ............... 324/140, 141, 142; 328/160; 235/194

[56] References Cited
UNITED STATES PATENTS
3,610,910 10/1971 Udall ........................... 328/160 X

*Primary Examiner*—Alfred E. Smith
*Attorney*—Marcus Lothrop et al.

[57] ABSTRACT

An electrical power measuring device is for use with electrical quantities such as alternating voltage and current and has a voltage integrator connected through an impedance across a selected source of alternating voltage and supplied with a local current of one polarity and of a predetermined value and also supplied with a local current of the opposite polarity and of substantially twice the predetermined value. A level detector responsive to voltage level in the integrator is effective through a pulse mechanism to switch one of the local currents off and on and simultaneously to switch a circuit extending between the selected current source and an output measuring or actuating device. Various amplifying, storage and filtering devices are used.

4 Claims, 6 Drawing Figures

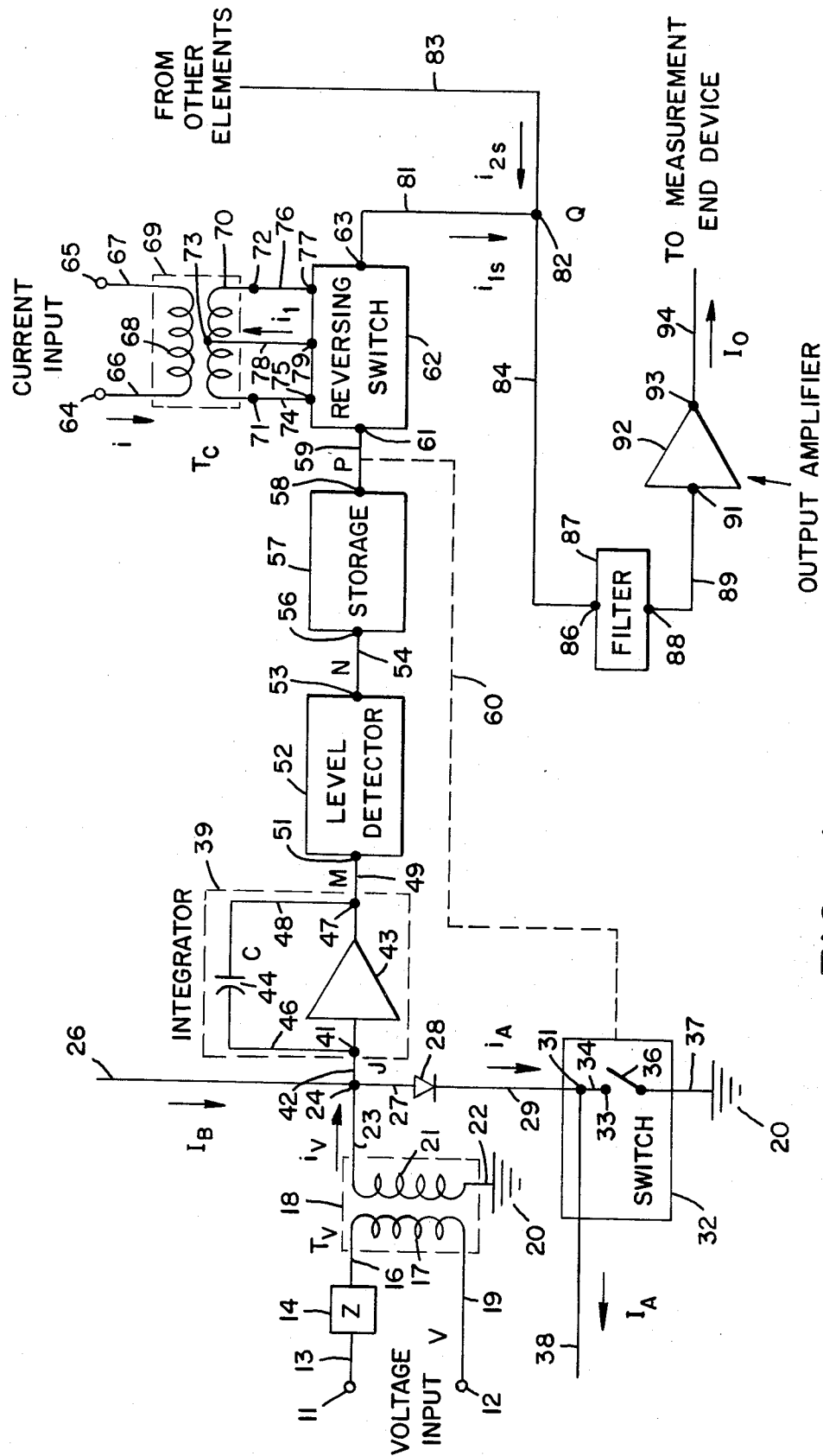
FIG_1

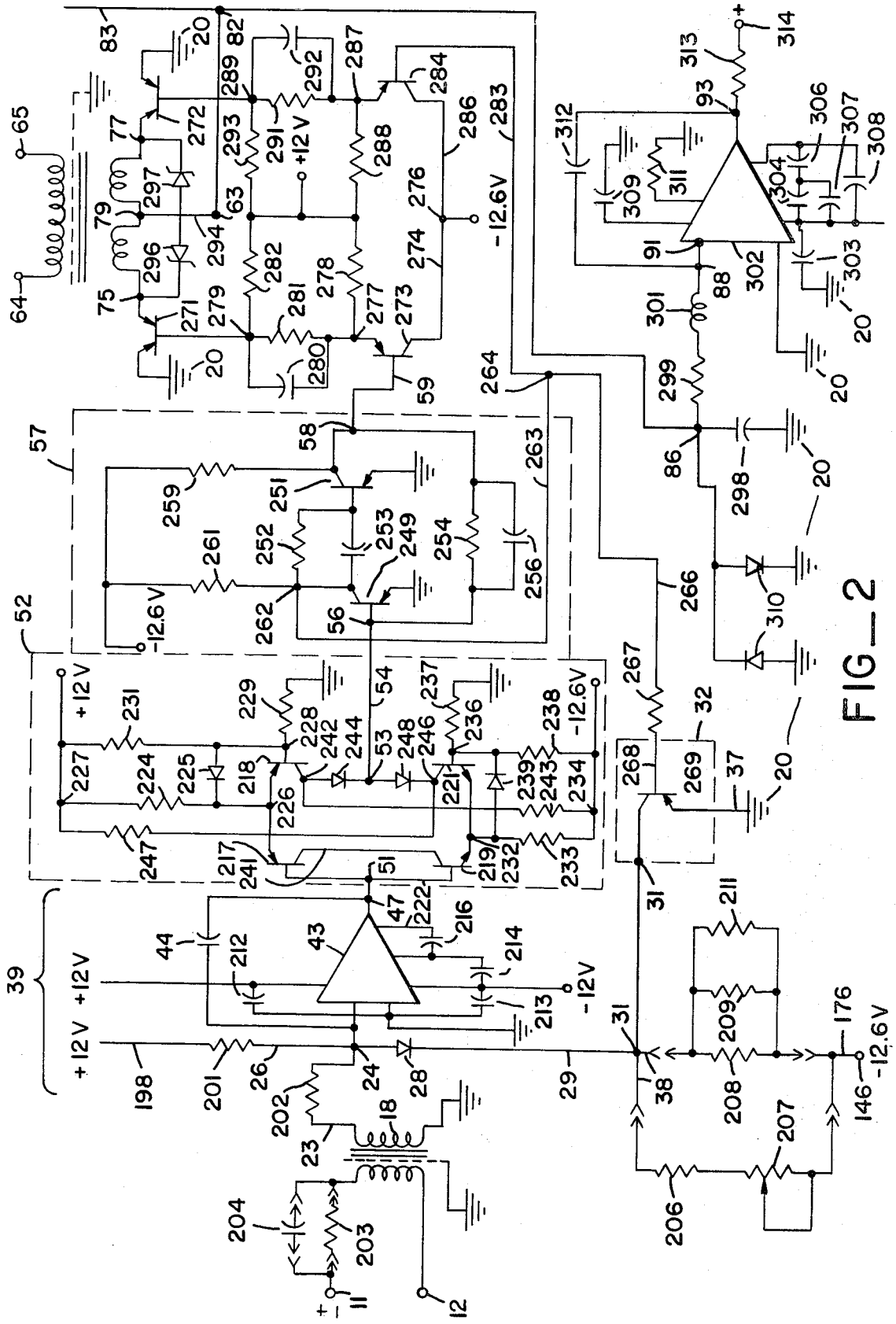
FIG_2

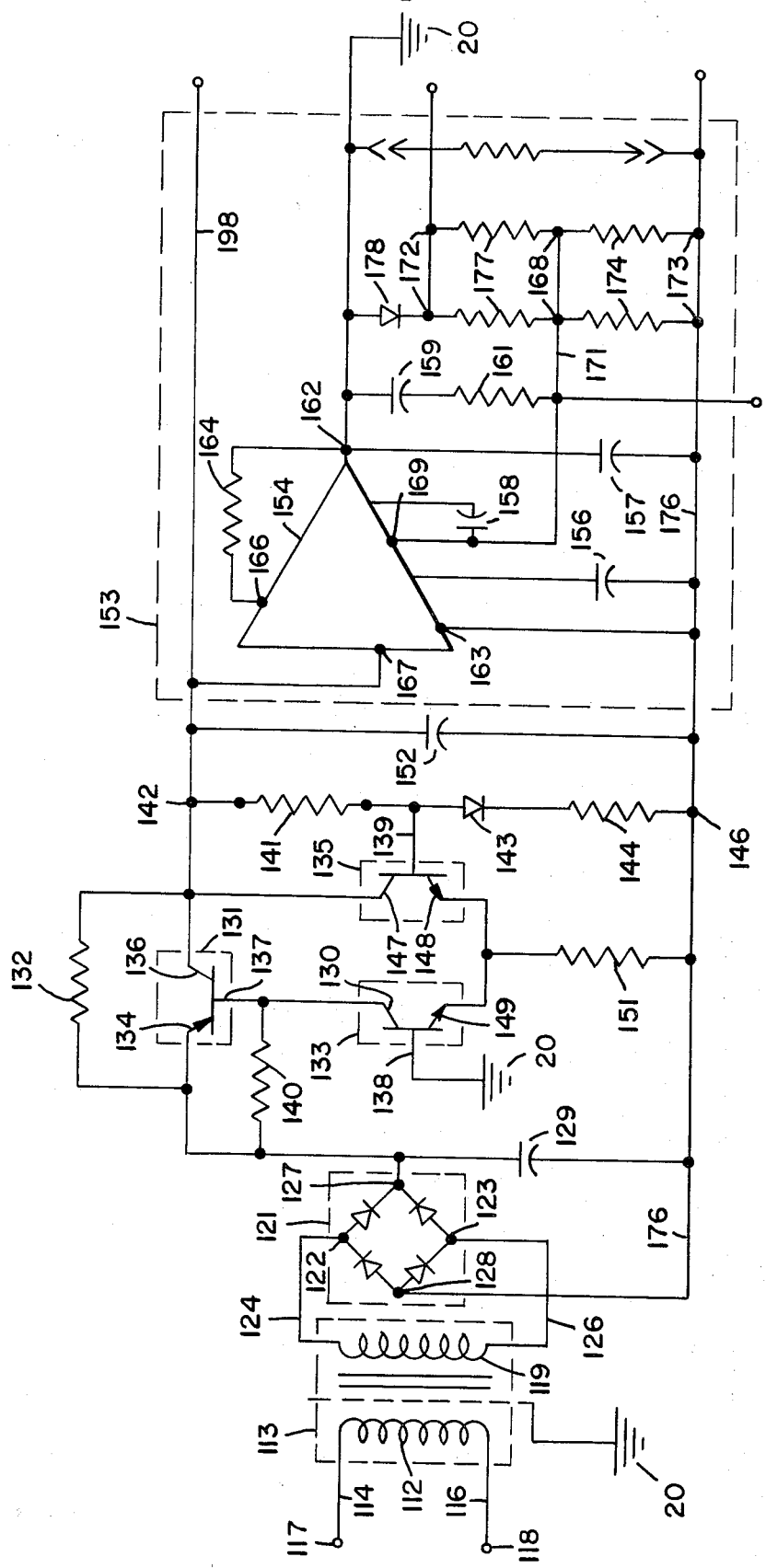
FIG_3

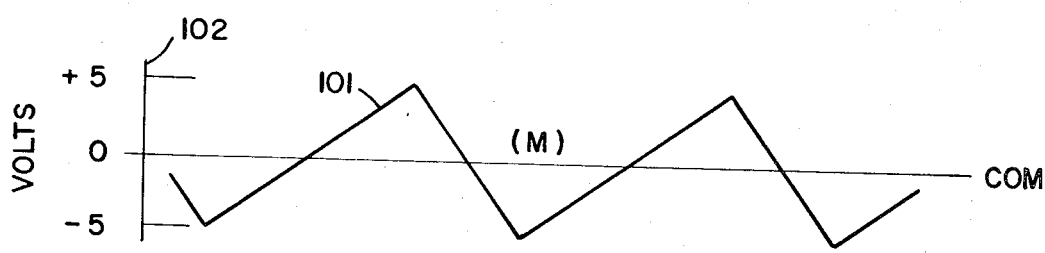
FIG_6
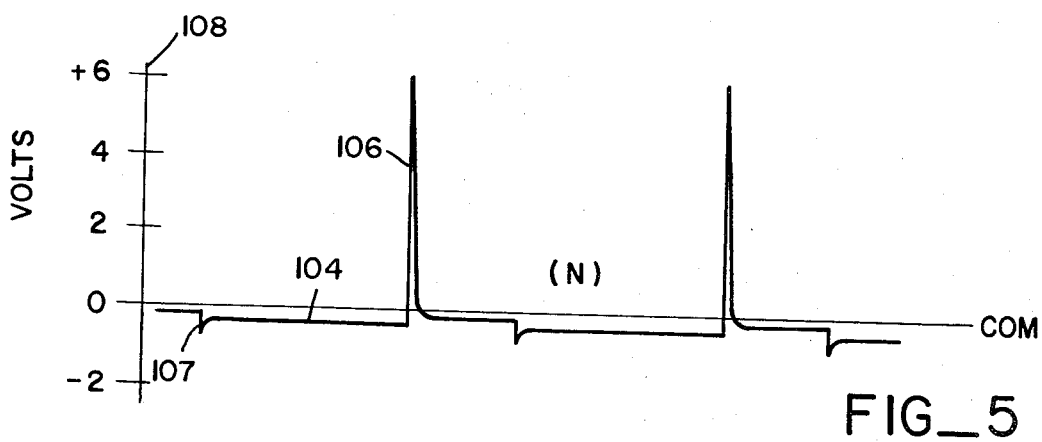
FIG_5
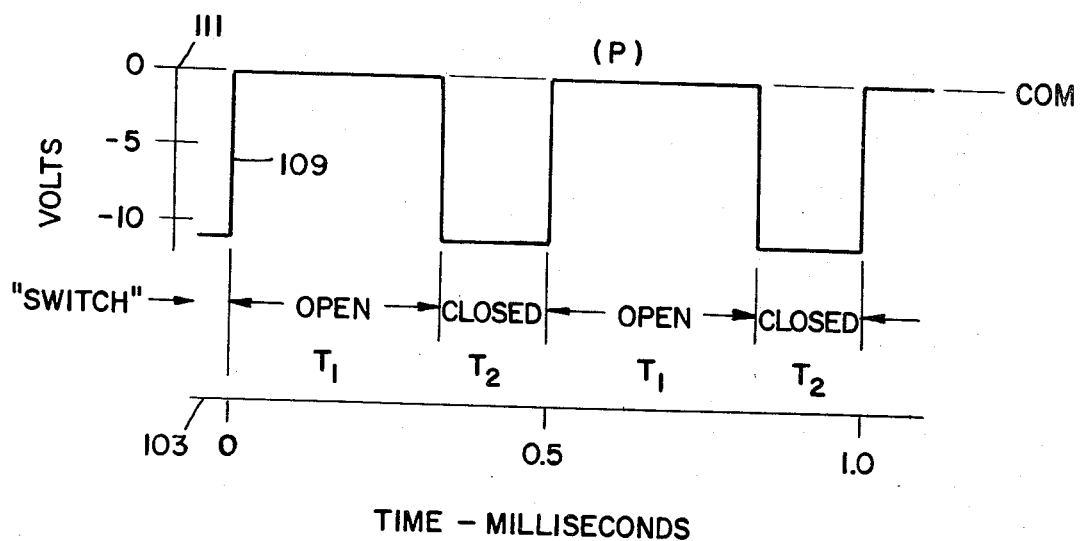
FIG_4

ELECTRICAL POWER MEASURING DEVICE

This invention relates generally to the measurement of electrical power consumed by a device and particularly to apparatus for obtaining by electrical and electronic means the arithmetic product of two electrical (voltage, current) values indicative of power, and especially to the measurement of power of the type distributed through standard mains by power companies to various users; i.e., low frequency, alternating voltage and current.

Most efficient utilization of a.c. power is accomplished when the phase of a current flowing through a load is the same as that of the voltage impressed across that load. The nature of many electrical loads is such that a phase difference is induced by the load between the voltage and the current. Then, for a given power taken by the load at a given voltage, more current flow is required than were there no phase difference. It is important that both in-phase and out-of-phase components of voltage and current be measured. The product of the in-phase components of voltage and current gives a measure of the power consumption of the load, and the product of the out-of-phase components of voltage and current gives a measure of the efficiency with which the power is being employed.

Many common electro-mechanical power measuring devices are neither convenient for use in connection with a remote monitoring station, nor for the control of devices ancillary to the load being monitored.

There is need for an economical and effective device affording an accurate measurement of the product of voltage and current associated with a load, either the in-phase or the out-of-phase components being measured, so that the result may be sent easily by any of several standard transmission techniques to a monitor or control.

It is therefore an object of this invention to provide an electrical power measuring device having the capability of measuring the in-phase component of power consumed by an electrical load.

It is a further object of this invention to provide an electrical power measuring device having the capability of measuring the out-of-phase component of power used by an electrical load.

It is a further object of this invention to provide a transducer for multiplying two electrical signals and providing an output signal proportional to their arithmetic product.

It is another object of the invention to provide an electrical current and voltage multiplier affording an output signal readily indicated at or transmitted to a selected station.

These and other objects of the invention are attained in the embodiment of the invention described in the following description and illustrated in the accompanying drawings, in which:

FIG. 1 is a block diagram of the electronic circuitry employed;

FIG. 2 is an electronic circuit diagram of a multiplier element forming part of the measurement device;

FIG. 3 is an electronic circuit diagram of a regulator element forming part of the measurement device; and FIGS. 4, 5 and 6 show voltage vs. time waveforms of some of the potentials occurring during the operation of the device.

One of the electrical signals employed, normally a voltage (V) (FIG. 1), is applied to a first set of input terminals 11 and 12, establishing a current flow from the terminal 11, through a conductor 13, a series impedance element (Z) 14, a conductor 16, the primary winding 17 of a transformer ($T_v$) 18, a conductor 19, and to the terminal 12, thus completing a primary circuit. This transformer, as are all transformers herein, is provided with a guard shield (not shown) for bypassing high voltage surges to ground. The impedance element 14 is used as a meter for proper operation of the device, proportioning the current flow in the primary circuit to the input voltage. If the impedance element 14 is a resistive device, the current flow in the primary circuit is in phase with the voltage impressed across the terminals 11 and 12. If the impedance element 14 is a reactive device; for example, a capacitor or inductor, the current flow in the primary circuit is out of phase by approximately 90° with the voltage impressed across the terminals 11 and 12.

Current flow through the primary winding 17 induces a voltage across the secondary winding 21 of the transformer 18, causing a current ($i_V$) to flow between a circuit common 20 through a conductor 22, the winding 21, a conductor 23 and a junction 24. Flowing into the junction 24 by way of a conductor 26 is a reasonably regulated, known, positive direct current ($I_B$) from a later described source. The junction 24 is joined via a conductor 27 through a diode 28 and a conductor 29 to a junction 31 of a controlled switch 32. The junction 31 is joined to a switch point 33 by a conductor 34. A switch leaf 36 is connected by a conductor 37 to circuit common 20. The junction 31 is also joined to a conductor 38 extending to a current sink and carries a precisely regulated, known, negative current ($i_A$) at least and about twice the magnitude of the current $I_B$. By design the current $i_V$ is always less than the current $I_B$. When the switch leaf 36 is open, the current ($i_A$) in the conductor 29 is equal to $I_A$ and when the switch leaf 36 is closed, the current $i_A$ is virtually zero. The diagrammatic mechanical switch 32 may in practice be a transistor.

An integrator 39 has an input terminal 41 connected to the junction 24 by a conductor 42 (point J). The integrator 39 employs an inverting operational amplifier 43 and a feedback capacitor (C) 44. This is a precision unit with a fixed capacitance. One terminal of the capacitor 44 is connected to the amplifier input terminal 41 by a conductor 46, while the other terminal of the capacitor 44 is connected to an amplifier output terminal (M) 47 by a conductor 48. For a current flow into the input terminal 41, the amplifier affords a negative polarity voltage at the output terminal 47. The amplifier has a high input impedance and a large gain.

In operation, any current flowing into the input terminal 41 of the integrator 39 will flow, with the exception of a very small fraction, through the conductor 46, the capacitor 44, and the conductor 48 to the output terminal 47. The very small current fraction not flowing via the conductor 46 flows into the input of the amplifier 43. The output voltage of the amplifier assumes a corresponding value equal to that of the charge placed on the capacitor 44 by the major current flow therethrough, divided by the known or fixed capacitance of the capacitor 44. The charge on the capacitor 44 is equal to the product of the current flow through the capacitor 44 and the length of time during which the current is flowing. Thus, the voltage at the output terminal 47 of the integrator 39 is itself proportional to the current flow into the terminal 41 of the integrator 39 multiplied by the time during which it flows. This is shown in FIG. 6, wherein a trace 101 represents the charge on the capacitor 44 as represented by the voltage at the point M, the output terminal 47 of the integrator 39, as a function of time over two cycles or so of operation. The ordinate 102 represents output voltage values in a typical device, while the abscissa 103 (common to FIGS. 4, 5 and 6) represents time.

Voltage appearing at the terminal 47 is applied via a conductor 49 to the input terminal 51 of a level detector 52. Whenever the voltage appearing at the input terminal 51 equals a preset value, the level detector 52 generates a voltage pulse at its output terminal 53. The polarity of this output pulse is determined by the polarity of the input voltage appearing at the terminal 51. A typical waveform is shown in FIG. 5 as a trace 104, having a positive pulse 106 and a negative pulse 107 coinciding with the points of inflection of the trace 101 (FIG. 6). The ordinate 108 represents values of voltage.

The pulse outputs from the terminal 53 are carried by a conductor 54 (point N) to an input terminal 56 of a storage element 57. This, conveniently, is a bistable multivibrator serving as a memory, to retain and transmit information regarding the polarity of the last pulse received therein. The storage element 57 is employed to determine or establish the status of the switch 32, doing so through an output terminal (P) 58 joined to a conductor 59 having a branch conductor 60 extending to the switch 32. The condition of the switch 32 is shown as a trace 109 in FIG. 4, an ordinate 111 indicating the voltage effective to actuate the switch, the time abscissa being as before.

The conductor 59 also extends to an input terminal 61 of a reversing switch 62 having an output terminal 63, the status or condition of the switch 62 being controlled by the same pulse that is effective upon the switch 32. The reversing switch 62 is supplied from current input terminals 64 and 65, current flow ($i$) being through conductors 66 and 67 to a primary winding 68 of a transformer 69 ($T_c$). Current flow in the primary winding 68 induces a voltage in a secondary winding 70 having end terminals 71 and 72 and a center tap terminal 73. A conductor 74 connects the end terminal 71 to a terminal 75 on the reversing switch, while a conductor 76 connects the other end terminal 72 to a terminal 77 on the reversing switch. The center tap terminal 73 is joined by a conductor 78 to a center tap 79 on the reversing switch.

The action of the reversing switch 62 is to connect the terminal 71 to circuit common via the conductor 74 and the terminal 75 and alternately therewith to connect the terminal 72 to circuit common via the conductor 76 and the terminal 77. Current ($i_1$) flowing in the conductor 78 between the terminal 73 and the terminal 79 appears at the output terminal 63 and is carried ($i_{1S}$) via a conductor 81 to a current summing junction (Q) 82.

Other currents ($i_{2S}$) from similarly connected reversing switches may be introduced at the summing junction 82; for example, by a conductor 83. Current flow at the summing junction 82 is carried via a conductor 84 to the input terminal 86 of a low-pass filter 87. Low frequency currents (including d.c.) passing through the filter 87 appear at an output terminal 8 and are carried via a conductor 89 to an input terminal 91 of an output amplifier 92. An output terminal 93 of the amplifier 92 is connected via a conductor 94 carrying a current ($I_o$) to a suitable control, measuring or indicating device, not shown.

A common use for the device is the measurement of power consumed by a load operating from a 50 or 60 Hz. a.c. power source. The circuit action under this condition can readily be followed by first assuming a condition of no voltage V impressed across the terminals 11 and 12 and no current flow $i$ through the terminals 64 and 65. It may be assumed that, at the start, the switch 32 is open. At the junction 24 there is a steady current flow $I_B$ into the junction through the conductor 26. There is a switched flow of current $i_A$ in the conductor 27. The voltage appearing at the output terminal 47 of the integrator 39 is proportional to the positive charge developed on the capacitor 44, and this charge is equal to the current flowing through the capacitor 44 from the junction 24 via conductors 42, 46 and 48, multiplied by the time during which the current flows. That is, $Q=i_c t$, where $Q$ is the charge on the capacitor, $i_c$ is the current measure, and $t$ is the duration of current flow.

When the switch 32 is open, $Q_o=(i_A+I_B)t_1$, wherein $Q_o$ is the positive charge accumulated when the switch 32 is open, $i_A$ and $I_B$ are as before, and $t_1$ is the time interval during which the switch 32 is open. During this time the voltage at the terminal 47 rises to a level sufficient to actuate the level detector 52. The resulting positive pulse then put out by the level detector 52 sets the storage element 57 to a condition of most negative voltage at the output terminal 58 and through the conductor 60 correspondingly closes the switch 32.

When the switch 32 is closed, the charge on the capacitor 44 is $Q_c=Q_o+I_B t_2$, wherein $Q_c$ is the negative charge accumulated when the switch 32 is closed, $I_B$ is as before, and $t_2$ is the time interval during which the switch 32 is closed. The voltage at the terminal 47 then falls to a level sufficient again to actuate the level detector 52 to an opposite polarity at the same voltage value as before. The resulting negative pulse put out by the level detector 52 sets the storage element 57 to a condition of most positive voltage at the output terminal 58, and through the conductor 60 moves the switch 32 back to open position, completing a full cycle, which is substantially symmetrical when plotted and repeats indefinitely.

At the end of each full cycle the charge on the integrating capacitor 44 returns to the starting charge of zero coulombs. Therefore, at the end of the cycle, $Q=0$, and $(i_A+I_B)t_1+I_B t_2=0$ and $I_B=i_A(t_1/t_1+t_2)$.

When a voltage is impressed across the terminals 11 and 12, an input current $i_V$ augments the charge accumulated on the capacitor 44 during both portions of the integration cycle, and $(i_A+I_B+i_V)t_1+(I_B+i_V)t_2=0$ and $i_V(t_1+t_2 V)I_B(t_1+t_2)+i_A t_1=0$. If $i_A=-2I_B$, by selection, then $i_V(t_1+t_2)+I_B(t_2-t_1)=0$ and $i_V=I_B(t_1-t_2)/t_1-t_2$.

Since $I_B$ is a known, constant current, variations in $i_V$ will cause the time fraction $(t_1-t_2)/t_1+t_2$ to vary correspondingly; more particularly, the quantity $(t_1-t_2)$ will vary, since $(t_1+t_2)$ is constant. The impressed voltage across the terminals 11 and 12 therefore results in an equivalent time function varying in magnitude from $-1$ to $+1$ as the fraction $i_V/I_B$ varies from $-1$ to $+1$. This time function appears as the invention between pulses at the output of the terminal 58 of the storage element 57 and is illustrated in FIG. 4 as the trace 109. The reversals at the terminal 58 afford identical reversals of the reversing switch 62 and the switch 32.

Current i in a particular direction from an external circuit connected to the input terminals 64 and 65 causes a related current to flow in the conductor 81 and through the junction 82. The direction of that current flow is determined by the state of the reversing switch 62. Inasmuch as the time required for one integration cycle and one switching cycle of the switches 32 and 62 is very short compared with the time required for one alternation of the voltage and current being monitored, the current flow through the terminals 64 and 65 is, for any moment, considered unidirectional and of constant amplitude.

When there is no voltage impressed across the terminals 11 and 12 and $t_1$ equals $t_2$, the current ($i_{1S}$) from the terminal 63 of the regularly operating switch 62 and flowing in through the junction 82, the conductor 84 and the filter 87 will flow in each of the two directions for equal amounts of time, resulting, on balance, in no net current flow in either direction. At the output terminal 88 of the filter 87 there will be no current flow at all, the filter elements having removed any alternating components generated by the switch 62.

When there is a voltage impressed across the terminals 11 and 12, the resulting added current $i_V$, as noted above, makes the times $t_1$ and $t_2$ become unequal, with an inequality proportional to the impressed voltage. The operation of the reversing switch 62 is also no longer at equal intervals so the currents do not cancel out, but a net current flow between the output terminal 88 and the input terminal 91 results. This net current flow is proportional to the product of the current flowing through the current input terminals 64 and 65 multiplied by the fraction $t_1-t_2/t_1+t_2$. Since this fraction is proportional to the voltage V impressed across the input terminals 11 and 12, the output current flowing in the conductor 89 is proportional to the arithmetic product of the voltage V across the terminals 11 and 12 and the current i flowing through the terminals 64 and 65. The output current at the terminal 91 is therefore proportional to the volt-amperes consumed by an electrical load being monitored. Similarly, the current $I_o$ at the output terminal 93 of the amplifier 92 will be proportional to the volt-amperes consumed.

The foregoing is the circuit action for a single integration cycle. In practice there are many integration cycles for each alternation of input voltage or current, with a unique product for each integration cycle. A slowly varying product, averaged over many alternation periods of the incoming voltage and current, is obtained by using the same low-pass properties of the filter 87 as are used to remove the alternating components generated by the reversing switch 62.

The in-phase component of the a.c. power used is measured if the series impedance element 14 (Z) is a resistor. The reactive component of power is measured if the series impedance element 14 is a capacitor. Further, the arithemetic product of any two slowly varying voltages and/or currents may be obtained, if the input circuits connected to the terminals 11 and 12 and 64 and 65 are properly arranged.

In a detailed embodiment shown in FIG. 3, operating power is obtained from standard a.c. mains connected to the primary winding 112 of a power transformer 113 via conductors 114 and 116 having terminals 117 and 118. The ends of a secondary winding 119 of the transformer 113 are connected to a full-wave bridge rectifier 121 at its terminals 122 and 123 via conductors 124 and 126. Positive polarity, pulsating voltage is obtained at a terminal 127 of the bridge rectifier 121, and negative polarity, pulsating voltage is obtained at a terminal 128 of the bridge rectifier. A pulsating d.c. voltage appears across the terminals 127 and 128 and is smoothed by a filter capacitor 129.

The smoothed voltage is applied to a voltage regulator including a series pass transistor 131 and a protective shunt resistor 132 connected between the transistor emitter 134 and collector 136. The regulator also includes transistors 133 and 135 connected in a differential amplifier configuration disposed to shunt some of the current supplied through a resistor 140 to the base 137 of the transistor 131. The shunt path is through the collector 130 of the transistor 133, and the current shunted is in response to the difference between the voltage at circuit common 20 (the transistor base 138) and the voltage at the transistor base 139.

The voltage applied to the base 139 is a feedback voltage derived from the positive potential output of the regulator through a voltage divider network including a resistor 141 between a positive output terminal 142 of the regulator and the base 139, and a series combination of a diode 143 and a resistor 144 connected between the base 139 and a negative output terminal 146 of the regulator. The collector 147 of the transistor 135 is connected to the positive output terminal 142, and the emitter 148 of the transistor 135 is connected to the emitter 149 of the transistor 133, both emitters being connected to the negative terminal 146 through a resistor 151. The regulator output is smoothed by a capacitor 152 connected across the terminals 142 and 146. The use of circuit common as a reference potential for the regulator ensures that the output voltages appearing at the terminals 142 and 146 will be approximately equally disposed about circuit common. Through further regulating circuitry, the voltages may be precisely disposed with exact symmetry or may be slightly offset from common.

The current $i_A$ supplied to the junction 24 and negative potential for other operations are provided through an additional or second regulator circuit 153. This employs a commercially available voltage regulator module 154; for example, type CA3055, manufactured by RCA Corporation, together with adjunct bypass capacitors 156 and 157 and stabilizers, a capacitor 158, a series connected combination of a capacitor 159 and a resistor 161, and an inherent or added current boosting output transistor.

An output terminal 162 of the module 154 is connected to circuit common 20 so that the module maintains a constant voltage difference between a negative voltage input terminal 163 connected to the negative voltage junction 146 of the power supply and circuit common 20. Current limiting action is supplied by a resistor 164, connected between the output terminal 162 and a limiting terminal 166 of the module 154. A positive input terminal 167 of the module 154 is connected to the junction 142 of the first regulator.

The module 154 generates a reference voltage, against which a set fraction of the output voltage is compared. The comparison voltage for the module 154 appears at twin junctions 168 and is transferred to a comparison input terminal 169 by a conductor 171. Between twin junctions 168 and twin negative supply voltage junctions 173 are connected resistors 174. The junctions 173 are connected to the junction 146 and the junction 128 by a conductor 176. Also connected to the junction 168 and extending to twin junctions 172 are resistors 177. A diode 178 is connected at its anode to the junction 172 and in series to the output terminal 162. The series combination of the diode 178, the resistors 177 and the resistors 174 provides a voltage divider action. For the desired voltage difference between circuit common 20 and the terminals 173, the voltage at the junction 168 is equal to the reference voltage internally generated and appearing in the module 154.

The current $I_B$, referred to hereinabove, is obtained by application of the positive voltage appearing at the terminal 142 through a conductor 198 (FIGS. 2 and 3) to one end of a resistor 201 (FIG. 2), the other end of which is connected via the conductor 26 to the junction 24. The current $i_V$ described hereinabove is obtained from the voltage available in the conductor 23 from the transformer 18. This current is applied through a resistor 202 to the junction 24.

The impedance element (Z) 14 may be the alternatively used resistor 203 and capacitor 204 or phase shifting transformers and resistance-capacitance ladder networks with shunt capacitors.

The switched current, referred to hereinabove as $i_A$, is obtained from the negative output terminal 146 (FIGS. 2 and 3) of the power supply through the conductor 176 joined to a series-parallel combination of fixed and variable resistors 206, 207, 208, 209 and 211. The other end of the resistor combination is connected to the terminal 31 of the switch 32. The amplifier 43 of the integrator 39 is preferably a commercial unit; for example, type CA-3033, manufactured by RCA Corporation, together with suitable bypass capacitors 212, 213, 214 and 216, properly arranged between the various terminals of the amplifier 43 and power supply voltages, as suggested by the manufacturer.

The level detector 52 in this embodiment includes two sets of transistors, each set being in differential amplifier configuration, and one set being the complement of the other, both sets having common input and output terminals. One set is active when the input voltage to the detector is in the region of a positive polarity threshold, and the other set is active when the input voltage is in the region of a negative polarity threshold. The level detector output voltage is either positive, negative, or zero, depending on whether the input voltage is in the region of a positive polarity threshold, a negative polarity threshold, or away from either region, respectively.

The bases of two transistors 217 and 219 are connected via a conductor 222 to the input terminal 51 of the level detector 52. The transistor 217 has its emitter joined with the emitter of a transistor 218 at a junction 226. One end of a resistor 224 is joined to the junction 226, while the other end of the resistor has a junction 227 to the positive power supply. The base of the transistor 218 is joined to a junction 228 between which and circuit common a biasing resistor 229 is disposed. Between the junctions 228 and 227 is a biasing resistor 231, and connected between the junctions 228 and 226 is a diode 225. The diode cathode is connected to the junction 226. In a similar fashion, the emitter of a transistor 219 is joined with the emitter of a transistor 221 at a junction 232. One end of a resistor 233 connects to the junction 232, while the other end is connected to the negative power supply line at a junction 234. The base of the transistor 221 is joined to a junction 236 connected to circuit common through a biasing resistor 237. Disposed between the junction 236 and the junction 234 is a further biasing resistor 238.

A diode 239 is connected to the junction 236 and has its anode connected to the junction 232. The collector of the transistor 217 is joined to the collector of the transistor 219 by a conductor 241. The collector of the transistor 218 is joined to a junction 242 connected through a resistor 243 to the negative power supply at the junction 234. A diode 244 at its anode is connected to the junction 242 and at its cathode is connected to the output terminal 53 of the level detector. Similarly, the collector of the transistor 221 is joined to a junction 246 connected through a resistor 247 to the positive power supply at the junction 227. Disposed between the junction 246 and the output terminal 53 is a diode 248, connected with its anode joined to the terminal 53.

When the voltage at the input terminal 51 is zero, the base-emitter junctions of the transistors 217 and 219 are both forward biased, creating a current path the positive voltage supply to the negative voltage supply, the primary path being through the resistor 224, the transistor 217, the transistor 219 and the resistor 233. A secondary path is active at this voltage level, particularly from the positive supply junction 227 through the resistor 231 and the diode 225, and also through the diode 239 and the resistor 238 to the negative supply voltage junction 234. The voltage drops in the resistors 224 and 233 are sufficient to prevent current flow in the base-emitter junction of the transistors 218 and 221, thereby preventing current flow in the collector circuitry of these transistors and producing no voltage at the output terminal 53.

As the input voltage at the terminal 51 moves in the positive direction, there is a progressively smaller current flow through the transistor 217, causing a progressively smaller voltage drop in the resistor 224 until the diode 225 no longer conducts. At this point current previously flowing through the diode 225 is diverted to the junction 228. The junction voltage then assumes a value determined by the ratio of the resistance values of the resistors 231 and 229. The voltage so determined is the threshold voltage mentioned hereinabove. The resistance values of the resistors 224, 229 and 231 are so proportioned that when current flow through the diode 225 ceases, the base-emitter junction of the transistor 218 becomes forward biased, and the transistor turns on, causing current flow into the terminal 53 through the diode 244. The same current stoppage reverse-biases the base-emitter junction of the transistor 217, causing it to turn off.

When the voltage at the terminal 51 is positive, and even though the transistor 217 is turned off allowing no current flow, the transistor 219 acts as a forward biased diode through its base-emitter junction, maintaining current flow in the resistor 233 and in the diode 239 and resistor 238, thus keeping the transistor 221 in its inactive state. The resistor 243 establishes, when the transistor 218 is on, a maximum positive output voltage at the terminal 53. The diodes 244 and 248 isolate the circuit actions of the transistors 218 and 221 from each other, yet couple the resultant to the output of the level detector 52.

When the voltage at the input terminal 51 moves in a negative direction, the transistors 219 and 221 and their associated circuits provide a circuit action akin to the action described for positive voltage.

The storage or memory element 57 is a standard, two transistor, bstable multivibrator in the grounded emitter configuration. The base of a transistor 249 is connected to the input terminal 56 of the storage element and to an inter-transistor coupling network, comprised of a parallel combination of a resistor 254 and a capacitor 256. The opposite end of the network is connected to the output terminal 58, to which the collector of a transistor 251 is connected. Also joined to the terminal 58 is one end of a collector load resistor 259. The remaining end of the resistor 259 is connected to the negative power supply. Another inter-transistor coupling network is comprised of a resistor 252 in parallel with a capacitor 253 and is connected between a junction 262 and the base of the transistor 251. Also connected between the junction 262 and the negative power supply is a collector load resistor 261.

Pulses produced by the level detector 52 are applied to the base of the transistor 249 through the conductor 54. Arriving negative pulses turn on the transistor 249 and turn off the transistor 251, causing the junction 262 to approach zero volts and the output terminal 58 to approach the negative supply voltage. Arriving positive pulses at the input terminal 56 have the opposite effect on the transistors 249 and 251. The voltages appearing at the junction 262 and the terminal 58 are both used to drive the switch 32 in a symmetrical fashion. The collector voltage appearing at the junction 262 drives the switch 32, by way of a conductor 263 (60 in FIG. 1) through a junction 264, a conductor 266, a current limiting resistor 267, and a conductor 268 to the base of a transistor 269. In this embodiment, the transistor 269 performs the services ascribed to the diagrammatic switch contact 33 and switch leaf 36 of FIG. 1. When there is a voltage present at the junction 262 approaching the negative supply voltage, the transistor 269 is turned on and shunts the current $i_A$ to circuit common 20 through the transistor emitter connection and the conductor 37. With the voltage at the junction 262 near circuit common potential, the transistor 269 is off and the current $i_A$ flows by way of the junction 24.

The reversing switch 62 is implemented with symmetrical, semi-conductor switches. One switch 271 has one of its emitters connected to the input terminal 75, its other emitter being connected to circuit common 20. A second semi-conductor switch 272 has one of its emitters connected to the input terminal 77 and the other emitter connected to circuit common 20. When base current is allowed to flow through the base-emitter junction of either switch; for example, the switch 271, there is a current flow from emitter to emitter, and therefore between the input terminal 75 and circuit common. If there is no base current flow, there is, effectively, an open circuit between the emitters of the switch, and there is no current flow between the input terminal 75 and circuit common.

Base current flow for the switch 271 is derived from the storage element output terminal 58 by means of a transistor 273 connected in the emitter-follower configuration. The base of the transistor 273 is connected via the conductor 59 to the terminal 58. The collector of the transistor 273 is connected to the negative supply voltage via a conductor 274 to a junction 276 at the negative supply voltage potential. The emitter of the transistor 273 is connected to a junction 277 connected through a resistor 278 to the positive power supply voltage. Connected between the junction 277 and a junction 279 is a parallel combination of a resistor 281 and a capacitor 280. The base of the semi-conductor switch 271 is also connected to the junction 279. To the same junction is joined one end of a resistor 282, the other end of which is connected to the positive power supply voltage.

Base current flow for the semi-conductor switch 272 is derived from the junction 262 in the storage element 57 through conductors 263 and 283 by means of a transistor 284, connected in the emitter-follower configuration, like its counterpart, the transistor 273. The collector of the transistor 284 is connected to the negative power supply voltage at the junction 276 by means of a conductor 286. The emitter of the transistor 284 is connected to a junction 287 connected through a resistor 288 to the positive power supply voltage. Also connected to the junction 287 and extending to a junction 289 is a parallel arrangement of a resistor 291 and a capacitor 292. Connected from the junction 289 to the positive power supply voltage is a resistor 293. Also connected to the junction 289 is the base of the semi-conductor switch 272.

Assuming the voltage at the storage element terminal 58 is near the negative power supply voltage, the potential at the emitter of the transistor 273 is negative with respect to circuit common, and base current flows from an emitter of the switch 271 through the resistor 281 and the transistor 273 to the negative power supply terminal 276. The capacitor 280 serves to reduce the time required for the switch 271 to go from its non-conducting state to its conducting state. At the same time, the base of the transistor 284 is at a potential near that of circuit common, as are its emitter and junction 287. The switch 272 has no current flowing in its base, since the junction 289, by virtue of the voltage divider action of the resistors 291 and 293, is at a potential slightly more positive than circuit common, back-biasing the emitter base junction of the switch 272. When the storage element 57 has its state reversed, the voltage at the terminal 58 reverses and the roles played by the transistor 273 in conjunction with the switch 271 and by the transistor 284 in conjunction with the switch 272 are reversed.

A conductor 294 joins the input terminal 79 of the reversing switch 62 with the output terminal 63 of that switch. Protective Zener diodes 296 and 297 are connected in series, anode to anode, between the switch input terminals 75 and 77 to prevent excessive accidental voltage excursions at these points from damaging the semi-conductor switches 272 and 271.

The low-pass filter 87 and the output amplifier 92, shown separately in FIG. 1, may be partially combined as shown in FIG. 2. A shunt capacitor 298 is connected between the filter input terminal 86 and circuit common 20. A series connected resistor 299 and, if desired, an inductor 301, connected between the filter input terminal 86 and the filter output terminal 88, comprise the initial stage of output current filtering. Relating the current flow through the filter 87 to meet the requirements of the final output, together with the final stage of filtering, is accomplished by a commercially available operational amplifier 302; for example, type CA3033, manufactured by RCA Corporation. Bypass capacitors 303, 304, 306, 307, 308 and 309 are suitably disposed between the various terminals of the amplifier 302 and the power supply circuits or circuit common, as recommended by the manufacturer. A pair of diodes 310 connected between the terminal 86 and circuit common 20 serve to limit transient surges in the amplifier 302. The d.c. component of the output current is almost exactly equal to the d.c. component of the current in the conductor 84. The amplifier 92 sustains the output d.c. voltage as demanded by the value of output load resistance used. A resistor 311 prevents overloading.

Final filtering is accomplished by means of a capacitor 312, one end of which is connected to the output terminal 93 of the amplifier 92, and the other end of which is connected to the input terminal 91 of the amplifier 92. An auxiliary resistor 313 is connected in series between the amplifier output terminal 93 and an output terminal 314 and protects the amplifier 302 from damage due to possible malfunction of external circuits or devices connected to the terminal 314.

What is claimed is:

1. An electrical power measuring device for use with a selected alternating voltage source and a selected current source comprising a first transformer having a primary winding and a secondary winding, an impedance, means for connecting said primary winding of said first transformer and said impedance in series across said voltage source, and integrator having an input terminal and an output terminal, means for connecting said secondary winding of said first transformer to ground and to said integrator input terminal, a first source of local current of one polarity and of predetermined value, means for connecting said first source to said input terminal of said integrator, a second source of local current of opposite polarity and of substantially twice said predetermined value, means for connecting said second source to said input terminal of said integrator, a circuit common, a switch effective in one condition to connect said second source to said circuit common and in another condition to isolate said second source from said circuit common, a level detector, means for connecting the output terminal of said integrator to said level detector whereby a voltage of a predetermined level at said output terminal produces a pulse from said level detector, a storage element, means for supplying pulses from said level detector to said storage element, means controlled by said storage element for alternating said switch between said one condition and said other condition, a reversing switch having an input and an output, means joining said input to said storage device, means joining said output to said measurement device, a second transformer having a primary winding and a secondary winding, means for connecting said primary winding of said second transformer across said selected current source, means for connecting said secondary winding of said second transformer across said reversing switch whereby the ends of said second winding of said second transformer are alternately connected to circuit common, a center tap in said secondary winding of said second transformer, and means for connecting said center tap through said reversing switch to the output of said reversing switch.

2. A device as in claim 1 in which said integrator includes a capacitor and an inverting amplifier connected in parallel.

3. A device as in claim 1 in which said lever detector is responsive to voltage at the output of said integrator over a time base.

4. A device as in claim 1 in which said pulse is effective simultaneously to change the condition of said switch and said reversing switch.

* * * * *